United States Patent
Barthel et al.

(10) Patent No.: US 6,566,622 B1
(45) Date of Patent: May 20, 2003

(54) WIRE ELECTRODE

(75) Inventors: Bernd Barthel, Herborn-Merkenbach (DE); Bernd Neuser, Herborn-Merkenbach (DE)

(73) Assignee: Berkenhoff GmbH, Heuchelheim (DE)

( * ) Notice: Subject to any disclaimer, the term of this patent is extended or adjusted under 35 U.S.C. 154(b) by 0 days.

(21) Appl. No.: 09/534,141

(22) Filed: Mar. 23, 2000

(30) Foreign Application Priority Data

Mar. 25, 1999 (DE) .......................... 199 13 694

(51) Int. Cl.⁷ .......................... B23H 1/00; B23H 1/04; B23H 1/06
(52) U.S. Cl. .................. 219/69.12; 219/69.15
(58) Field of Search .................. 219/69.12, 69.15; 148/518, 536

(56) References Cited

U.S. PATENT DOCUMENTS

| | | | | |
|---|---|---|---|---|
| 4,341,939 A | * | 7/1982 | Briffod et al. | 219/69 W |
| 4,968,867 A | | 11/1990 | Banzai et al. | 219/69.12 |
| 5,206,480 A | * | 4/1993 | Nakai et al. | 219/69.12 |
| 5,808,262 A | * | 9/1998 | Mukherjee | 219/69.12 |
| 5,945,010 A | * | 8/1999 | Tomalin | 219/69.12 |

FOREIGN PATENT DOCUMENTS

| | | |
|---|---|---|
| DE | 30 35 058 | 4/1981 |
| DE | 293 762 | 9/1991 |
| DE | 196 35 775 | 3/1998 |
| EP | 312 674 | 4/1989 |
| JP | 59-129624 | 7/1984 |
| JP | 59-134624 | 8/1984 |
| JP | 60-249529 | 12/1985 |
| JP | 61-117021 | 6/1986 |
| JP | 63-162118 | 7/1988 |
| JP | 64-78724 | 3/1989 |
| JP | 3-236431 | 10/1991 |
| JP | 9-11048 | 1/1997 |

* cited by examiner

*Primary Examiner*—M. Alexandra Elve
(74) *Attorney, Agent, or Firm*—Flynn, Thiel, Boutell & Tanis, P.C.

(57) ABSTRACT

A wire electrode, and a method for making it, for use in spark-erosive cutting having an electrically conducting core essentially absorbing the tensile forces. The wire electrode has furthermore a coating which wears during erosion, which coating consists of two layers. Such a wire electrode is suited for both quick cutting and also for fine cutting of workpieces. The wire electrode has for this purpose an inner layer of the coating, which serves the quick cutting process and consists of an essentially homogenous alloy. Whereas the outer layer of the coating is provided for the fine cutting and has a zinc content of above 80 wt. %, whereby the layer thickness of the outer layer lies at ⅕ of the layer thickness of the remaining coating.

14 Claims, No Drawings

WIRE ELECTRODE

FIELD OF THE INVENTION

The invention relates to a wire electrode for use in spark-erosive cutting and, more particularly, to a wire electrode having an electrically conductive core essentially absorbing the tensile forces and a coating comprising of at least two layers.

BACKGROUND OF THE INVENTION

A workpiece can be eroded or cut by means of such a wire electrode. The cutting occurs thereby almost always through a main cut (quick cut) and one or several recuts (fine cut). The task of the quick cut is to cut the contour from the full material of the workpiece. This is, because of the amount of material to be eroded, the most time-consuming operating step of the cutting process. In order to keep the working time as short as possible, a very high discharge energy is used. Wires with a coating layer having a high Zn-content, which themselves are only relatively little worn during the erosion, are best suited for this. The eroding wire must at the same time be pulled with a considerable speed through the cutting gap in order to guarantee that the coating layer is not completely worn through while in the cutting gap. This indeed results in a quick cutting, however, this has the disadvantage that the surfaces of the cut or eroded workpiece sides are not of a sufficient quality for many uses. The energy-rich discharge operations leave irregularities on the cut surface. Moreover the cutting gap becomes conical due to the wearing of the electrode. This necessitates one or more recuts to trim the conical or inclined sidewalls of the gap to make them comply with the customer's requirements.

The surface of the workpiece is then refinished during the recuts or fine cuts. The surface is hereby smoothed and only the contour not corresponding to the desired shape is removed. This smoothing task is achieved with lesser discharge energies so that the demanded quality of the workpiece (parallelism, surface quality, dimensional accuracy) is achieved. The number of the recuts depends thereby mainly on the desired surface quality of the workpiece.

The discharges eroding the workpiece between the erosion wire and the workpiece occur in a de-ionized chamber. In order for a spark to be able to occur at all in this de-ionized chamber between the wire electrode and the workpiece, a conductive channel must be built for this purpose in order to start the actual impulse. The element zinc has proven to be particularly advantageous for this built-up. It enables a quick and safe formation of the first conductive bridge, even at very low energies or electric currents. This is especially advantageous for fine cuts. Wire electrodes coated with zinc have found a wide use based on this. The core material of such wire electrodes can be of any desired type, preferred are copper, brass, steel and composite wires (steel-copper). With these zinc-coated electrodes, it was possible in older WEDM-machines with performance-poor generators to obtain a clear performance increase of the cutting result compared to uncoated electrodes. A further advantage was, in particular, the one where through the very easy volatility of the zinc a stable erosion process was possible already at very low electric energies. This is the condition, as already discussed above, for the erosion of very fine or smooth surfaces.

Improved generator technology has made it possible today to produce more and more energy-rich sparks. This converts the advantage of the easy volatility of the zinc into a disadvantage since the zinc is very quickly removed during the process and thus is no longer available for erosion especially during the quick cutting process. An increase of the zinc-layer thickness in order to balance this greater rate of erosive wear has proven to be ineffective.

Brass-coated wire electrodes were able to be of help here. In the case of these brass-coated wire electrodes, a high zinc-containing brass alloy is used as the envelope of the core wire. The zinc layer with its very low volatilization temperature and the disadvantage of the high rate of erosive wear was, due to the improvement in generator technology, replaced with an alloy layer having a high zinc content. This had the advantage that the outer coating had a higher resistance against erosive wear than a pure zinc coating. The layer thickness of this high zinc-containing brass layer can furthermore be significantly thicker than a pure zinc layer. It was then possible with this type of electrodes to also operate new WEDM-machines with more powerful generators in quick cutting processes. However, a disadvantage, compared with zinc-coated electrodes, is that the surface quality of the eroded workpieces is not of the same high quality as the surface of the workpieces which were eroded with zinc-coated wire electrodes. Even in the case of a repeated cutting using wires with diffused outer coatings, surface qualities, as they are achieved with Zn-coated electrodes, are not achieved.

The basic purpose of the invention is to provide a wire electrode product and a method of making it, with the product of which it is possible, on the one hand, to create the finest of surfaces on the workpieces, namely, to carry out fine cuts and, on the other hand, to cut the workpiece with a high speed using the quick cutting method.

SUMMARY OF THE INVENTION

A wire electrode, and a method for making it, for use in spark-erosive cutting having an electrically conducting core essentially absorbing the tensile forces. The wire electrode has furthermore a coating which wears during erosion, which coating consists of two layers. Such a wire electrode is suited for both quick cutting and also for fine cutting of workpieces. The wire electrode has for this purpose an inner layer of the coating, which serves the quick cutting process and consists of an essentially homogeneous alloy. The inner layer is applied onto the core of the wire electrode by one of plating, galvanizing, powder-coating and fire-metallizing. Whereas the outer layer of the coating is provided for the fine cutting and has a zinc content of above 80%, whereby the layer thickness of the outer layer lies at ⅕ of the layer thickness of the remaining coating. The wire electrode is, if necessary, in a second step diffusion-annealed followed by a reshaping of the wire electrode to a predetermined diameter such that the composition of the coating remains essentially the same.

Such an inventive wire electrode is suited for both a quick cutting process and also a fine cutting process. In the case of the quick cutting process, a high current flows during sparking between the workpiece and the wire electrode. The outer layer of the coating is thereby directly removed so that this layer contributes only insignificantly to the quick cut. The resistant inner layer takes over the main load during the quick cut. When a fine cut is supposed to occur, a smaller current flows and only the outer layer, namely, the high zinc-containing layer, is consumed. The inventive wire electrode is thus a universal electrode, which is suited for both a quick cut and also for a fine cut, with which a fine surface on the workpiece is produced. Thus an electrode change is no longer needed during the machining process since both quick and also fine cuts can be carried out with the same inventive electrode. This saves, on the one hand, standstill/set up periods, and the workpiece need not be newly moved and adjusted each time.

It is advantageous when the outer layer of the coating consists 100% of zinc. The inner layer of the coating contains advantageously 37 to 60% zinc. The zinc of the inner layer can be advantageously a brass alloy, the zinc content of which lies between 40 to 48%. The inner layer has advantageously a homogeneous β and/or γ-structure. The zinc atoms are, in the case of cubic body-centered crystal lattice, bound in such a manner that they can be sufficiently easily removed from the wire electrode for igniting the arc between the workpiece and the wire electrode, on the other hand, however, are held so tight that the wear rate is limited.

It is furthermore advantageous when the inner layer has a thickness of at least 2.5 μm. The outer layer of the wire electrode has advantageously a layer thickness of 0.5–5 μm.

The core consists in a first, particularly advantageous embodiment of the wire electrode of CuZn 20 having a diameter of 0.25 mm, the inner layer has a content of 45% zinc and has a thickness of 15–20 μm, whereas the outer layer has a layer thickness of 2–3 μm. The wire electrode has advantageously a tensile strength of at least 800 N/mm².

A second, particularly suitable embodiment has a core of CuZn 35, an inner layer having a content of zinc of 45%, which is 10–15 μm thick and an outer layer having a thickness of 1–2 μm. The second embodiment of the wire electrode has advantageously a tensile strength of at least 900 N/mm². The wire electrode both in the first embodiment and also in the second embodiment can, according to the invention, have a specific electric conductivity of 12–50 MS/m.

The inventive method for the manufacture of one of the above-mentioned wire electrodes can be divided into the following inventive method steps:

The inner layer is applied onto the core in a first step. This can be done advantageously by plating, galvanizing, powder-coating or fire-metallizing. This is followed, if necessary, in a second step by a diffusion annealing of the wire electrode. The outer layer is thereafter in a further step applied to the inner layer. The subsequent reshaping to a predetermined diameter is done such that the composition and the structure of the coating remain the same, so that a heating up of the wire electrode, which would result in a significant diffusion, does not occur.

The diffusion annealing can occur advantageously in a continuous flow through a fluidized bed kiln at a temperature rising from 350° to 600° Celsius, in an annealing time of two minutes.

A quick cooling off occurs after the diffusion annealing in order to fix the diffusion state.

DETAILED DESCRIPTION

Two advantageous exemplary embodiments are described in greater detail hereinafter:

A first exemplary embodiment for an inventive wire electrode has a diameter of 0.25 mm, whereby the layer thickness of the outer layer is 2–3 μm, the layer thickness of the inner layer is 15–20 μm. The outer layer is a pure zinc layer, whereas the inner layer is a brass layer with a zinc content of 45%. The wire of this wire electrode has a tensile strength of approximately 800 N/mm² and a specific electric conductivity which is 17 Ms/M.

A second exemplary embodiment for an inventive wire electrode has also a total diameter of 0.25 millimeters, whereby the layer thickness of the outer layer is 1–3 μm and the layer thickness of the inner layer is 10–15 μm. The outer layer is again a pure zinc layer, whereas the inner layer is also, just like already in the first exemplary embodiment, a brass layer which has a zinc content of 45%. The tensile strength of this wire of the wire electrode is approximately 900 N/mm², whereby the specific electric conductivity is 15 MS/m.

What is claimed is:

1. A wire electrode for use in spark-erosive cutting having an electrically conducting core essentially absorbing the tensile forces and a coating wearing during erosion, which coating consists of two layers, wherein the inner layer of the coating has a composition which is suited for a quick cutting and consists essentially of a homogenous alloys and wherein the outer layer of the coating is zinc or a zinc alloy which is suited for a fine cutting and has a zinc content of above 80 wt. %, and wherein the layer thickness of the outer layer amounts to up to one fifth of the layer thickness of the remaining coating.

2. The wire electrode according to claim 1, wherein the inner layer has a zinc content of 37 to 60 percent by weight of zinc.

3. The wire electrode according to claim 1, wherein the inner layer consists of a brass and has a zinc content of 40 to 48 percent by weight.

4. The wire electrode according to claim 1, wherein the inner layer has a homogenous β-and/or γ-structure.

5. The wire electrode according to claim 1, wherein the inner layer has at least a layer thickness of 2.5 μm.

6. The wire electrode according to claim 1, wherein the outer layer has a layer thickness of 0.5 to 5 μm.

7. The wire electrode according to claim 1, wherein the core consists of CuZn 20, wherein the inner layer has a content of 45 percentage by weight of zinc and a layer thickness of 15–20 μm, and wherein the outer layer is 2 up to 3 μm thick.

8. The wire electrode according to claim 7, wherein the wire electrode has a tensile strength of at least 800 N/mm².

9. The wire electrode according to claim 1, wherein the core consists of a CuZn-alloy with 35–37 percentage by weight of Zn, wherein the inner layer has a content of 45 percentage by weight of zinc and a layer thickness of 10–15 μm, and wherein the outer layer is 1–2 μm thick.

10. The wire electrode according to claim 9, wherein the wire electrode has a tensile strength of at least 900 N/mm².

11. The wire electrode according to claim 7, wherein the wire electrode has a specific electric conductivity of 12 to 50 MS/m.

12. A method for manufacturing a wire electrode used in spark-erosive cutting, said method comprising the steps of:
  providing an electrically conductive electrode core;
  forming an inner layer of a zinc alloy having a zinc content of 37 to 60 wt. % zinc on the electrode core through one of plating, galvanizing, powder-coating and fire-metallizing; and
  forming an outer layer of zinc or a zinc alloy having a zinc content of above 80 wt. % zinc on the inner layer, the thickness of the outer layer being no greater than one fifth of the total layer thickness of the inner and outer layers.

13. The method of claim 12, wherein the electrode core has a composition of CuZn20 and has a diameter of 0.25 mm, the inner layer has a zinc content of 45 wt. % and a thickness of 15–20 $\mu$m and the outer layer has a thickness of 2–3 $\mu$m and consists of zinc.

14. The method of claim 12, wherein the electrode core has a composition of CuZn35, the inner layer has a zinc content of 45 wt. % and a thickness of 10–15 $\mu$m and the outer layer consists of zinc and has a thickness of 1–2 $\mu$m.

\* \* \* \* \*